United States Patent
Pfeiffer et al.

[19]

[11] Patent Number: 5,966,983
[45] Date of Patent: Oct. 19, 1999

[54] ASSEMBLY FOR SENSING AND/OR MONITORING A PREDETERMINED LEVEL IN A VESSEL

[75] Inventors: Helmut Pfeiffer, Steinen; Igor Getman; Sergej Lopatin, both of Lörrach, all of Germany

[73] Assignee: Endress + Hauser GmbH + Co., Maulburg, Germany

[21] Appl. No.: 09/156,726

[22] Filed: Sep. 17, 1998

[30] Foreign Application Priority Data

Sep. 22, 1997 [EP] European Pat. Off. ............ 97116486

[51] Int. Cl.$^6$ ........................................ G01F 23/00
[52] U.S. Cl. ............................................... 73/291
[58] Field of Search ............ 73/291, 1.31, 1.82, 73/1.83, 599, 643, 727; 340/620, 621, 521

[56] References Cited

U.S. PATENT DOCUMENTS

| | | | |
|---|---|---|---|
| 4,594,584 | 6/1986 | Pfeiffer et al. | 73/290 V |
| 4,901,245 | 2/1990 | Olson et al. | 73/290 V |
| 5,099,454 | 3/1992 | Dieulesaint et al. | 340/621 |
| 5,155,472 | 10/1992 | Dam | 340/621 |
| 5,452,611 | 9/1995 | Jones et al. | 73/290 V |
| 5,837,898 | 11/1998 | MacLauchlan | 73/599 |

FOREIGN PATENT DOCUMENTS

| | | |
|---|---|---|
| 0 070 334 | 1/1983 | European Pat. Off. . |
| 0 409 732 | 1/1991 | European Pat. Off. . |
| 3 336 991 | 5/1985 | Germany . |
| 2 290 142 | 12/1995 | United Kingdom . |
| WO 95/16190 | 6/1995 | WIPO . |

Primary Examiner—William Oen
Attorney, Agent, or Firm—Bose McKinney & Evans LLP

[57] ABSTRACT

An assembly for sensing and/or monitoring the level of a material in a vessel includes a level sensor mounted in the vessel so that it comes into contact with the material when the material has attained a predetermined level. The level sensor contains a low-frequency sensing system and a high-frequency sensing system. The low-frequency sensing system is formed by a mechanical vibrator system induced to vibrate at its natural resonant frequency, and establishing whether the mechanical vibrator system is in contact with the material or not is achieved by evaluating the frequency and/or amplitude of the mechanical vibrations. For forming the high-frequency sensing system high-frequency elastic vibration is induced in a component of the level sensor, and establishing whether this component is in contact with the material or not is achieved by evaluating an electric signal generated as a function of the high-frequency elastic vibration.

21 Claims, 5 Drawing Sheets

ASSEMBLY FOR SENSING AND/OR MONITORING A PREDETERMINED LEVEL IN A VESSEL

BACKGROUND OF THE INVENTION

The invention relates to an assembly for sensing and/or monitoring the level of a material in a vessel with the aid of a level sensor comprising a mechanical vibrator system and an electromechanical transducer system, the level sensor being applied to the vessel so that the mechanical vibrator system comes into contact with the material when the material has attained a predetermined level, and wherein the transducer system is connected to a low-frequency emitter circuit configured so that it induces low-frequency vibration in the mechanical vibrator system, the assembly further comprising a low-frequency detector circuit furnishing from evaluation of the frequency and/or amplitude of an electrical signal furnished by the transducer system an output signal indicating whether the mechanical vibrator system has come into contact with the material or not.

An assembly of this kind is known, for example, from DE 33 36 991 A1. In this known assembly the mechanical vibrator system consists of two vibrating rods secured juxtaposed spaced away from each other to a diaphragm, the rim of which is connected to a grommet. The electromechanical transducer system comprises an exciting transducer and a receiving transducer. When an alternating voltage is applied to the exciting transducer it acts on the side of the diaphragm facing away from the vibrating rods so that the vibrating rods are caused to vibrate opposingly transversely to their longitudinal direction, and the receiving transducer converts the vibrations of the mechanical vibrator system into an electrical alternating voltage. The two transducers are connected to an amplifier in a self-exciting circuit so that vibration of the mechanical vibrator system is excited at its natural resonance frequency. The natural resonance frequency of the mechanical vibrator system depends on whether the vibrating rods are vibrating in air or are immersed in the material in the vessel; the natural resonance frequency in the immersed condition being lower than when vibrating in air, but in any case is below 1000 Hz in the low-frequency range. The low-frequency detector circuit compares the frequency of the electrical alternating voltage existing in the self-exciting circuit—this frequency being the same as the natural resonance frequency of the mechanical vibrator system—to a threshold value, and outputs an output signal indicating whether this frequency is above or below the threshold value.

An assembly known from DE 32 15 040 C2 for sensing and/or monitoring a predetermined level of a material in a vessel includes a mechanical vibrator system formed by a tubular hollow body in the cavity of which a transverse member is arranged secured by two opposing fastener points to the inner wall of the cavity. The transducer system, containing an exciting transducer and a receiving transducer, cooperates with the transverse member which can be caused to vibrate radially which is transmitted to the wall of the tubular hollow body. The natural resonance frequency of this mechanical vibrator system is in the range 20 to 30 kHz. The vibration of the outer wall of the cylindrical hollow body is damped by coming into contact with the material, the amplitude of the alternating voltage output by the exciting transducer changing accordingly. The exciting circuit compares the amplitude of this alternating voltage to a threshold value to indicate whether the tubular hollow body has come into contact with the material or not.

Known on the other hand are assemblies for sensing and/or monitoring the level of a material in a vessel which contain no mechanical vibrator system vibrating at its natural resonance frequency, they instead sensing the presence of a material at a predetermined level with the aid of elastic waves, the frequency of which is in the ultrasonic frequency range. Thus, EP 0 409 732 B1 or the corresponding DE 690 08 955 T2 describes a detector for indicating a liquid with a vertically arranged waveguide for elastic waves, the lower end of which is located level with the material level to be monitored. The waveguide has two cylindrical portions of which the upper portion is fully cylindrical and the lower portion may be fully cylindrical or tubular. A transducer mounted on the upper end of the waveguide emits pulsed elastic waves which run through the waveguide to the lower end. The frequency of the elastic waves is of the order of 75 to 125 kHz. When the lower end of the waveguide is not in contact with the liquid the emitted wave train is reflected at the end of the waveguide so that it is returned as an echo of larger amplitude to the transducer by which it is converted into an electrical detector signal of correspondingly high amplitude, whereas when the lower end of the waveguide is immersed in the liquid the wave train emitted by the transducer is absorbed by the liquid, resulting in a considerable attenuation of the reflected echo. By comparing the amplitude of the electrical detection signal to various threshold values it can thus be likewise established where the level is located within a specific section of the lower portion of the waveguide.

Available on the market are thus low-frequency and high-frequency systems for sensing and/or monitoring the level in a vessel by means of mechanical vibrations. Typical frequencies of the low-frequency sensing systems are in the audible sound range below 1000 Hz whilst typical frequencies of the high-frequency sensing systems are in the ultrasonic range above 15 kHz.

Each of these principles has its pros and cons depending on the material to be sensed and the prevailing ambient conditions. For instance, high-frequency sensing systems cause problems where gassy materials, such as carbonated beverages, are concerned since bubbles a t the mechanical vibrator system result in heavy smearage of the sensing signal. This problem can only be resolved by a complicated analysis of multiple reflections, whereas low-frequency sensing systems have no trouble working with gassy materials. The way in which the systems react to deposits having formed is also different. Where a soft deposit is concerned low-frequency sensing systems work unreliably, whereas high-frequency sensing systems are reliable, their response being the opposite in the case of hard deposits.

In conclusion, low-frequency sensing systems are ruined by low-frequency alien vibrations and high-frequency sensing systems by the high-frequency alien vibrations, whilst the one type of sensing system is not detrimented by the alien vibrations of the other frequency range in each case.

SUMMARY OF THE INVENTION

The object of the invention is to define a cost-effective assembly for sensing and/or monitoring the level of a material in a vessel which can be put to versatile use for sensing the level of different materials under differing conditions.

The present invention provides an assembly for sensing and/or monitoring the level of a material in a vessel with the aid of a level sensor comprising a mechanical vibrator system and an electromechanical transducer system, the level sensor being applied to the vessel so that the mechanical vibrator system comes into contact with the material when the material has attained a predetermined level, and wherein said transducer system is connected to a low-frequency emitter circuit configured so that it induces a low-frequency vibration in said mechanical vibrator system, said assembly further comprising a low-frequency detector circuit furnishing from evaluating said frequency and/or amplitude of an electrical signal furnished by said transducer system an output signal indicating whether said mechanical vibrator system has come into contact with said material or not, wherein a component of the level sensor, coming into contact with the material once having attained a predetermined level, is connected to an electromechanical transducer system for inducing high-frequency elastic vibration in said component and wherein a high-frequency evaluation circuit being provided which by detecting an electrical signal generated as a function of said high-frequency elastic vibration produces an output signal indicating whether said component is in contact with the material or not.

The assembly in accordance with the invention consists of a combination of a low-frequency sensing system and a high-frequency sensing system, a component of the low-frequency sensing system being used for the high-frequency sensing system. This solution is simple and cost-saving, and it results, more particularly, in the advantage that the conditions for installing the combined system are the same as for the low-frequency system by itself. Accordingly, the combined system can be installed simply by it replacing an existing low-frequency system without necessitating any modifications to the vessel involved. Since practically for each application at least one of the two sensing systems furnishes a useful result the combination system can be put to use in sensing or monitoring the level in a broad spectrum of materials and application conditions. In cases in which both sensing systems furnish useful results, a redundancy exists resulting in enhanced relibility and one sensing system being able to keep a check on the functioning of the other.

In one embodiment of the assembly in accordance with the invention the component of the level sensor used as the high-frequency sensing system is configured as an elastic waveguide in which the high-frequency elastic vibration propagates as a wave and the high-frequency evaluation circuit detects and evaluates the travel time of the elastic wave.

In another embodiment of the assembly in accordance with the invention the high-frequency evaluation circuit evaluates the frequency of the high-frequency elastic vibration of the component.

Advantagous configurations and further sophisticated aspects of the invention are characterized in the subordinate claims.

Further features and advantages of the invention read from the following description of example embodiments as shown in the drawings.

DETAILED DESCRIPTION OF THE DRAWINGS

Figure 1:
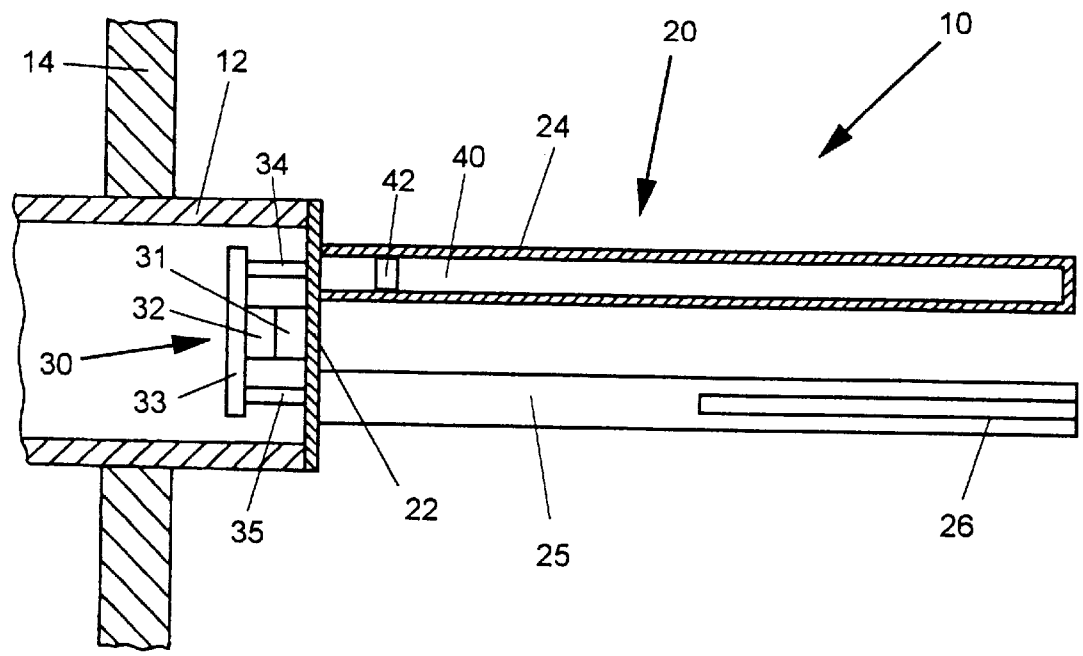
FIG. 1 is a section view of an assembly for sensing and/or monitoring the level in a vessel in accordance with a first embodiment of the invention.

Referring now to FIG. 1 there is illustrated a level sensor 10 for sensing and/or monitoring the level in a vessel, this level sensor comprising a tubular housing 12 secured in an opening of the vessel wall 14 level with the level to be monitored. The end of the housing 12 facing the interior of the vessel mounts a mechanical vibrator system 20. In the example shown the mechanical vibrator system 20 consists of a diaphragm 22 connected by its full rim to the edge of the tubular housing 12, and two vibrating rods 24 and 25, each of which is secured by one end to the diaphragm 22 so that they extend parallel to each other from the diaphragm 22 into the interior of the vessel. Mounted on each vibrating rod are two flat diametrally opposed paddles 26 extending from the free end of the vibrating rod over a portion of the vibrating rod length and located transversely to the plane containing the axes of the two vibrating rods. Of these paddles only one of the two paddles 26 of the vibrating rod 25 is evident from FIG. 1 whilst both paddles 26 of the vibrating rod 24 are to be seen from FIG. 4.

The side of the diaphragm 22 facing away from the vessel is connected to an electromechanical transducer system 30 configured so that it can induce vibration of the mechanical vibrator system 20 at its natural resonance frequency. For this purpose the electromechanical transducer system 30 contains an electromechanical exciting transducer 31 and an electromechanical receiving transducer 32. Each of the two electromechanical transducers 31 and 32 is configured so that it is able to convert an electrical alternating signal (alternating voltage or alternating current) into a mechanical vibration and vice-versa an input mechanical vibration into an output electrical alternating signal. As an example it is assumed that each transducer 31 and 32 is a piezoelectric transducer containing at least one piezoelectric element, one such piezoelectric element consisting, as is known, of a piezoelectric crystal slice arranged between two electrodes. The thickness of the piezoelectric crystal changes as a function of the elastic vibration applied to the electrodes and vice-versa mechanically prompted changes in thickness of the piezoelectric crystal produce an elastic vibration at the electrodes. The exciting transducer 31 is thus connected to the diaphragm so that due to the thickness vibrations of its piezoelectric crystal produced by application of an electrical alternating voltage, the diaphragm 22 is caused to vibrate, these vibrations being transmitted to the two vibrating rods 24 and 25 so that these vibrating rods execute opposing mechanical vibrations transversely to the longitudinal direction, it being understood that the vibration plane is the plane containing the axes of the two vibrating rods and which coincides with the plane of the drawing as shown in FIG. 1. The receiving transducer 32 is connected to the diaphragm 22 so that it produces due to the mechanical vibration of the diaphragm 22 an electrical alternating voltage between its two electrodes. The piezoelectric transducers 31 and 32 are sandwiched tensioned between the diaphragm 22 and a bridge 33 which is maintained spaced away from the diaphragm 22 by supports 34 and 35.

Figure 2:
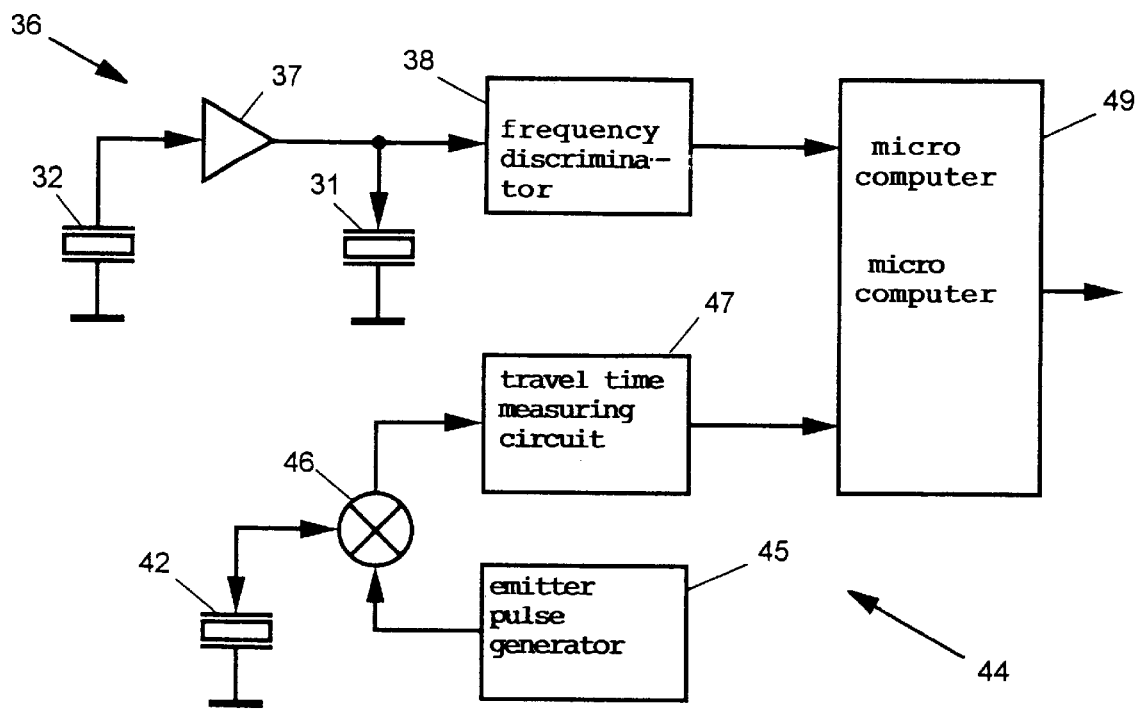
FIG. 2 is a circuit diagram of the exciting/evaluation circuits for the assembly as shown in FIG. 1.

In the way as shown in FIG. 2 the piezoelectric transducers 31 and 32 are connected to a low-frequency exciting/evaluating circuit 36 which may be accommodated in the housing 12. One electrode each of the two transducers 31 and 32 is connected to a ground terminal which may be formed by the diaphragm 22 and the housing 12. The other electrode of the receiving transducer 32 is connected to the input of an amplifier 37, to the output of which the exciting transducer 31 is connected. Accordingly, the level sensor 10 with the two transducers 31 and 32 connected to each other via the mechanical vibrator system 20 is located in the feedback circuit of the amplifier 37 configured so that the self-inducing condition is satisfied, i.e. vibration of the mechanical vibrator system is induced at its natural resonance frequency via the two transducers 31 and 32. This natural resonance frequency is located in the range of the audible acoustical frequencies, as a rule below 1000 Hz, i.e. it involving a low frequency.

For monitoring the level with the level sensor 10 as described hitherto use is made of the fact that the natural resonance frequency of the mechanical vibrator system 20 depends on whether the vibrating rods 24, 25 are vibrating in air or immersed in a material. The natural resonance frequency is dictated, on the one hand, by the the spring constant of the diaphragm 32 acting as a return spring and, on the other, by the vibrating mass. The vibrating mass consists of the mass of the vibrating rods 24, 25 and the mass of the medium surrounding the vibrating rods, entrained in the vibratory movement. When the vibrating rods 24, 25 are in air the entrained mass of air is negligable and a natural resonance frequency materializes which is dictated substantially by the mass of the vibrating rods. When, however, the vibrating rods 24, 25 are immersed in a material the entrained mass is greater and correspondingly the natural resonance frequency of the mechanical vibrator system is lower. This effect is amplified by the paddles 26 since these paddles enlarge the entrained mass of the material.

To sense the change in the natural resonance frequency of the mechanical vibrator system 20 a frequency discriminator 38 is connected to the output of the amplifier 37 in the circuit as shown in FIG. 2, this frequency discriminator comparing the frequency of the alternating voltage output by the amplifier 37—which is equal to the natural resonance frequency of the mechanical vibrator system 20—to a threshold value. When this frequency exceeds the threshold value the output signal of the frequency discriminator 38 has a first signal value indicating that the vibrating rods 25 and 25 are vibrating in air and thus the level being sensed has yet to be attained. When, however, the frequency of the alternating voltage output by the amplifier lies below the threshold value then the output signal of the frequency discriminator 38 has a second signal value indicating that the vibrating rods 24, 25 are covered by the material and thus the level being sensed has been attained or exceeded.

The configuration and way in which the low-frequency sensing system of the level sensor 20 functions are known, for example, from DE 33 36 991 A1. The level sensor as illustrated in FIG. 1 differs from this prior art by it being additionally equipped with a high-frequency sensing system.

The section view of the vibrating rod 24 in FIG. 1 makes it evident that this vibrating rod is configured as a hollow tube 40. The hollow tube 40 is closed off at the end facing away from the diaphragm 22. Mounted in the hollow tube 40 near to the diaphragm 22 is an ultrasonic transducer 42 so that the latter is able to transmit high-frequency ultrasonic vibrations to the hollow tube which can propagate as elastic waves in the hollow tube serving as a waveguide for the elastic waves. The elastic waves run along the hollow tube 40 to the closed-off end at which they are reflected and return as echo waves to the ultrasonic transducer 42. For monitoring the level with this high-frequency sensing system use is made of the fact that the velocity of propagation of the ultrasonic waves in the hollow tube 40 depends on whether the hollow tube 40 is in air or is immersed in a material, this velocity of propagation being lower—when the hollow tube is immersed due to the additional mass in contact with the tubular wall—than in air and as a result the travel time of the elastic waves with the hollow tube immersed is longer than when the hollow tube is in air.

The ultrasonic transducer 42 serving as the exciting transducer for emitting the elastic waves and as the receiving transducer for the reflected echo waves is preferably again a piezoelectric transducer designed for correspondingly high frequencies. Also illustrated in FIG. 2 is the exciting/evaluation circuit 44 for the high-frequency sensing system of the level sensor. An emitter pulse generator 45 generates at periodic points in time short high-frequency pulses which are applied via a duplexer 46 to the ultrasonic transducer 42 which is excited by each emitter pulse to emit an ultrasonic pulse having the same frequency. The echo pulse received after each emission of an ultrasonic pulse is converted by the ultrasonic transducer 42 into an electric reception pulse which is supplied via the duplexer 46 to a travel time measuring circuit 47. The travel time measuring circuit 47 establishes the travel time between emission of an emitter pulse and the arrival of the reception pulse and it compares the measured travel time to a threshold value. When the measured travel time exceeds the threshold value the output signal of the travel time measuring circuit 47 has a first signal value indicating that the hollow tube 40 is in air and thus the level being monitored has yet to be attained. When, however, the measured travel time is less than the threshold value the output signal of the travel time measuring circuit 47 has a second signal value indicating that the hollow tube 40 is covered by the material and thus the level being monitored has been achieved or exceeded.

So that it is possible to establish the travel time explicitly, the duration of the ultrasonic pulses must be short as compared to the travel time. The travel time in turn is very short due to the finite length of the vibrating rod 24. Accordingly the frequency of the ultrasonic waves must be high, it being, for example, in the order of magnitude of 30 kHz.

In this way the outputs of the frequency discriminator 38 and of the travel time measuring circuit 47 furnish two level indication signals materializing independently of each other under greatly differing conditions, namely on the one hand, a signal which depends on the low natural resonance frequency of a mechanical vibrator system influenced by the material and, on the other, a signal which depends on the velocity of propagation or travel time of high-frequency elastic waves influenced by the material. As a result the user has the following possibilities available for making use of these signals:

when the material to be monitored is of such a consistency that both sensing systems furnish valid results the two signals may be used to keep a check on each other thus enhancing the reliability of the sensing assembly. In this case the result is reliably valid when both signals indicate the same condition. When, however, the two signals indicate different conditions it may be established, where necessary, which of the two sensing systems is at fault so that sensing can be continued with the other sensing system;

when the material to be monitored is of such a consistency that only one of the two sensing systems is suitable for monitoring, then monitoring may be implemented with this sensing system whilst the other sensing system is OFF. Thus, for example, monitoring the level of gassy materials may be done with the low-frequency sensing system and monitoring materials tending to form a soft deposit with the high-frequency sensing system. As soon as alien vibrations exist the sensing system insensitive to the frequency of the alien vibrations may be used in each case, i.e. the low-frequency sensing system in the case of high-frequency alien vibrations and the high-frequency sensing system in the case of low-frequency alien vibrations.

Making use of the output signals of the two sensing systems in this way may be done by a common signal processing circuit formed, for example, by a microcomputer 49.

It will, of course, be appreciated that in the embodiment as shown in FIG. 1 the vibrating rod 25 must be configured so that it has precisely the same vibration response as the vibrating rod 24, i.e. it likewise being configured as a hollow tube having the same dimensions as the hollow tube 40 of the vibrating rod 24 and a suitable dummy mass being mounted in the vibrating rod 25 where the ultrasonic transducer 42 is located in the hollow tube 40. Optionally it is also possible to apply a further ultrasonic transducer in the vibrating rod 25 and to connect it to a corresponding emitter/detector circuit so that in addition to the low-frequency sensing system two high-frequency sensing systems are available. In this case the two high-frequency sensing systems may be used to keep a check on each other, as a result of which the reliability of the assembly is even further enhanced.

Figures 3, 4:
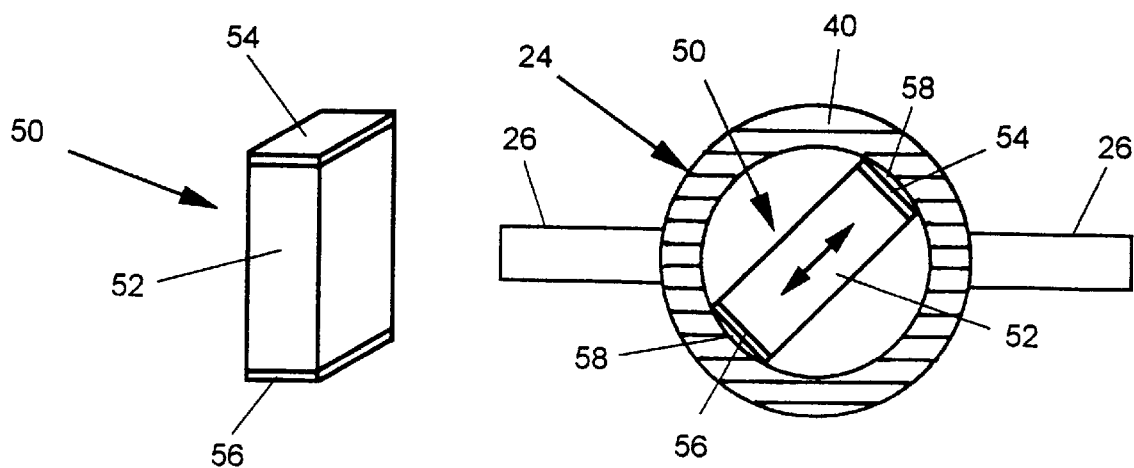
FIG. 3 is a perspective view of the ultrasonic transducer used in the assembly as shown in FIG. 1.
FIG. 4 is a cross-sectional view of the vibrating rod containing the ultrasonic transducer in the assembly as shown in FIG. 1.

Referring now to FIG. 3 there is illustrated in a perspective view a piezoelectric ultrasonic transducer 50 suitable for use as the ultrasonic transducer 42 in the assembly as shown in FIG. 1. FIG. 4 shows a cross-section through the section of the hollow tube 40 containing the ultrasonic transducer 50. The piezoelectric ultrasonic transducer 50 consists of a cuboidal piezoelectric crystal 52 dimensioned so that it is insertable in the hollow tube 40 and comes into contact with diametrally opposed points on the wall of the hollow tube. Mounted on the narrow sides of the piezoelectric crystal 52 facing the wall of the hollow tube are electrodes 54, 56 to which electric excitation pulses are applied so that the piezoelectric crystal 52 is caused to execute diametrally oriented thickness vibrations as indicated by the double arrow in FIG. 4. These vibrations are transmitted to the wall of the hollow tube 40 in which they propagate as elastic waves.

The piezoelectric transducer 50 may be secured in the hollow tube 40 by bonding for which an adhesive is used which fills out the circular segment-shaped cavities 58 between the electrodes 54, 56 and the inner surface area of the wall of the hollow tube 40, producing on hardening a rigid connection which transmits the vibrations of the piezoelectric transducer 50 to the wall of the hollow tube 40. Optionally the piezoelectric crystal 52 may also be formed so that the surface areas carrying the electrodes 54, 56 have the same curvature as the inner surface area of the wall of the hollow tube 40 and thus come into contact fully with this inner surface area on installation. This may be achieved, for example, by the piezoelectric crystal 52 being sliced from a circular disk, the diameter of which equals the inner diameter of the hollow tube 40.

Figure 5:
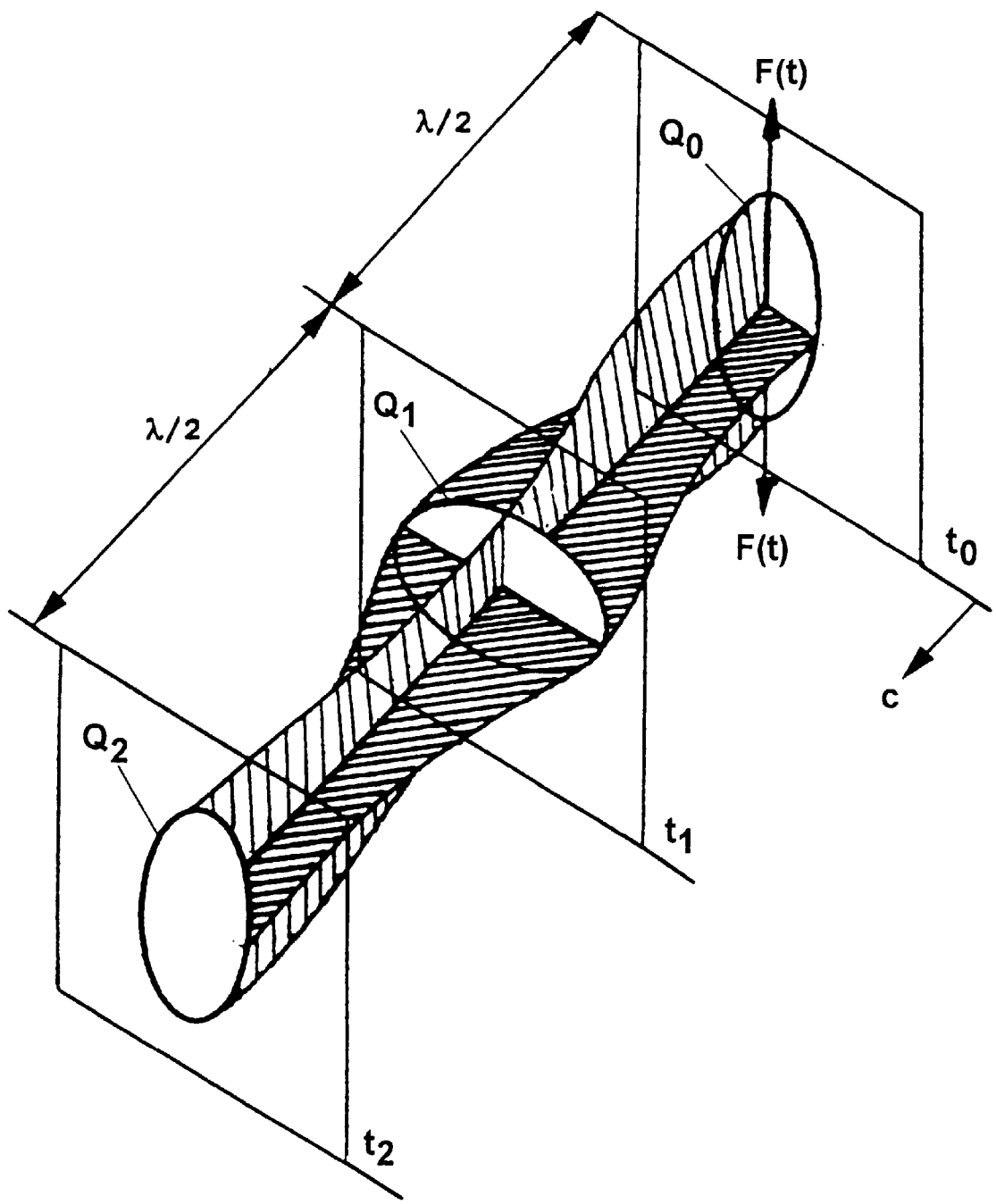
FIG. 5 is a schematic illustration of an elastic vibration as put to use in the assembly as shown in FIG. 1.

The piezoelectric transducer 50 induces vibration in the mode as shown in FIG. 5 of the tubular elastic waveguide formed by the hollow tube 40. At the point in time to the thickness vibrations of the piezoelectric crystal 52 produce the elliptically tubular cross-section $Q_0$ which after a half-period at the point in time $t_1$ translates into the elliptical cross-section $Q_2$ turned through 180° which again corresponds to the cross-section $Q_0$. This cross-sectional deformation propagates with the velocity of propagation c of the ultrasonic waves along the tubular waveguide so that each elliptical cross-section is turned through 90° relative to the other in spacings of half the wavelength ½.

So that the high-frequency vibration of the tubular vibrating rod 24 influences the low-frequency flexural vibration of the vibrating rod to a minimum extent in the example embodiment as shown in FIG. 1 it is good practice to excite the hollow tube 40 in this vibration mode such that each paddle 26 is located radially along a nodal line of the high-frequency vibration, it being for this reason, as evident from FIG. 4, that the piezoelectric transducer 50 is incorporated at an angle of 45° to the plane containing the paddles 26.

Figure 6:
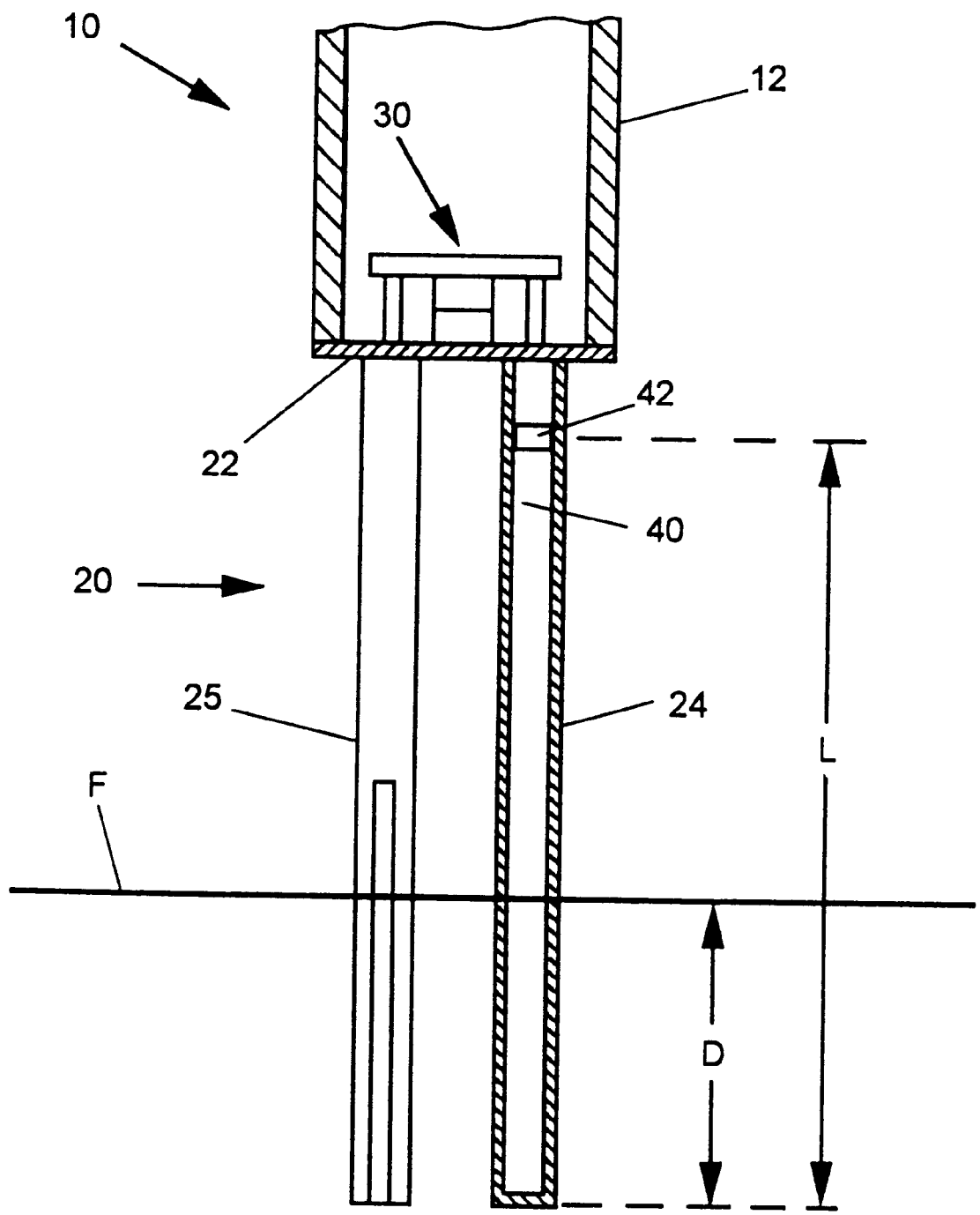
FIG. 6 is an illustration of another application of the assembly as shown in FIG. 1.

As illustrated in FIG. 1 the level sensor 10 may be secured horizontally in an opening in the vessel wall 14 level with the level to be monitored, but, as evident from FIG. 6 it may also be incorporated vertically in the vessel, this making no difference for monitoring the level by the low-frequency sensing system, whereas in this case the high-frequency sensing system permits establishing not only whether the level to be monitored has been achieved or not but also the precise level, i.e the level of the material surface F in the portion of the section L between the ultrasonic transducer 42 and the end of the elastic waveguide formed by the vibrating rod 24.

When the waveguide is not immersed in the material the ultrasonic waves generated by the ultrasonic transducer 42 propagate along the wall of the tube at the speed of sound c dictated by the material of the hollow tube 40. The travel time measured between emission of an ultrasonic pulse and reception of the echo pulse thus amounts for the round trip to $$T_M = 2 \cdot L/c \tag{1}$$

whereas when the vibrating rod 24, as evident from FIG. 6, is immersed in the material over a distance D the speed of sound c exists only in the non-immersed section of the length L−D. The portion of the travel time relevant to this section is $$T_1 = 2 \cdot (L-D)/c \tag{2}$$

By contrast, in the immersed section of the length D a lower speed of sound c* exists due to the additional mass in contact with the wall of the tube. The portion of the travel time relative to this section thus amounts to $$T_2 = 2 \cdot D c^* \tag{3}$$

Accordingly, the total travel time $T_M$ measured is composed as follows:

$$T_M = T_1 + T_2 = 2 \cdot [(L-D)/c + D/c^*] \tag{4}$$

from which the length D of the immersed section can be calculated.

Figure 7:
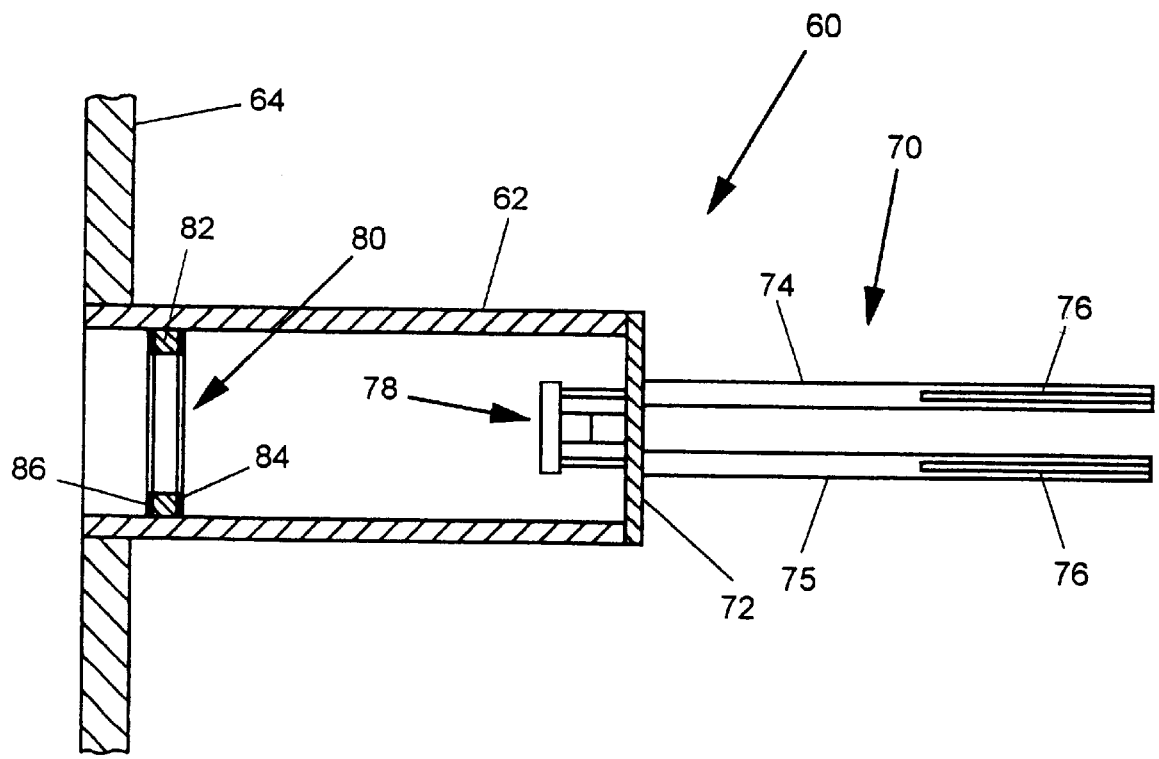
FIG. 7 is an illustration of a second embodiment of the assembly in accordance with the invention.

Referring now to FIG. 7 there is illustrated a second embodiment of a level sensor 60 including a low-frequency sensing system and a high-frequency sensing system. The level sensor 60 has a tubular housing 62 secured level with the level of the material to be monitored to a vessel wall 64 so that it is located fully or at least over the majority of its length in the interior of the vessel. The low-frequency sensing system again contains a mechanical vibrator system 70 including a diaphragm 72 which is connected by its full rim to the edge of the tubular housing 62 and has two vibrating rods 74, 75, each of which is secured by one end to the diaphragm 72 and each mounting at their free ends two opposing paddles 76. In this embodiment the vibrating rods 74, 75 consist of flat metal plates. The side of the diaphragm 72 located in the interior of the housing is connected to an electromechanical transducer system 78 configured so that it is capable of exciting vibration of the mechanical vibrator system 70 at its natural resonance frequency. The transducer system 78 is configured in the same way as the transducer system 30 as shown in FIG. 1 and is connected to an exciting/evaluation circuit of the type as evident from FIG. 2. To this extent the low-frequency sensing system of the level sensor 60 corresponds to the low-frequency sensing system of the level sensor 10 as shown in FIG. 1, it also functioning the same as the latter.

Figure 8:
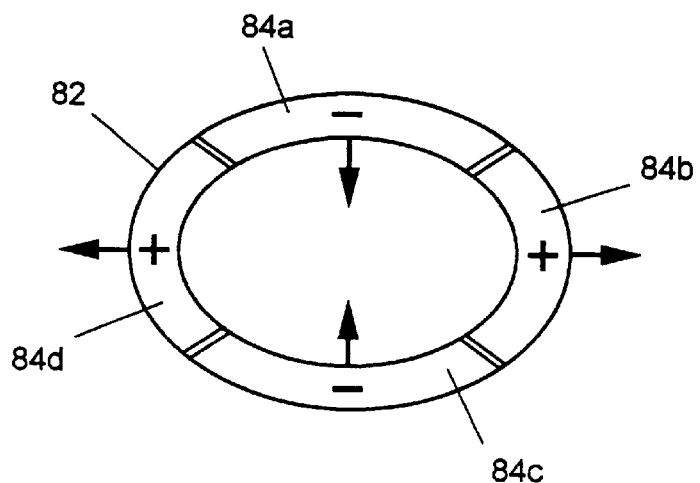
FIG. 8 is an illustration of a piezoelectric transducer as put to use in the assembly as shown in FIG. 7

Unlike the embodiment as shown in FIG. 1 the level sensor 60 evident from FIG. 7 it is not one of the two vibrating rods 74, 75 but the tubular housing 62 that is used as the elastic waveguide for the high-frequency sensing system. For this purpose a piezoelectric transducer 80 is mounted in the housing 62, the piezoelectric transducer consisting of an annular piezoelectric crystal 82, to the faces of which electrodes 84 and 86 are applied. The outer diameter of the piezoelectric crystal 82 corresponds to the inner diameter of the annular housing so that it is in contact by its circumferential surface area with the inner surface area of the housing watl to which it may be secured, for example, by bonding. One possible configuration of the electrodes 84 applied to one side of the piezoelectric crystal 82 is evident from FIG. 8. These electrodes consist of four sectors 84a, 84b, 84c and 84d; each of the diametrally opposed electrodes 84a, 84b, on the one hand, and 84c and 84d, on the other, is placed at the same potential as indicated by the plus and minus sign. The electrodes 86 applied to the opposite side are configured and circuited in the same way. The piezoelectric crystal is radially polarized such that it deforms to an elliptical cross-section—as illustrated exaggeratedly in FIG. 8—when exposed to the influence of an applied electrical voltage of a specific polarity applied to the electrodes 84 and 86, whilst deforming into an elliptical cross-section turned through 90° when an electrical voltage of opposite polarity is applied. The electrodes 84 and 86 are connected to an exciting/evaluation circuit of the kind as shown in FIG. 2 so that on application of an electrical emitter pulse the tubular waveguide formed by the housing 62 is excited to perform ultrasonic vibrations of the vibration mode as shown in FIG. 5. These ultrasonic vibrations propagate as elastic ultrasonic waves in the housing wall up to the end connected to the diaphragm 72 where they are reflected and returned as echo waves to the piezoelectric transducer 80. By sensing the travel time of the ultrasonic pulses it may be established whether the housing 62 is in air or whether it is immersed in the material.

Figure 9:
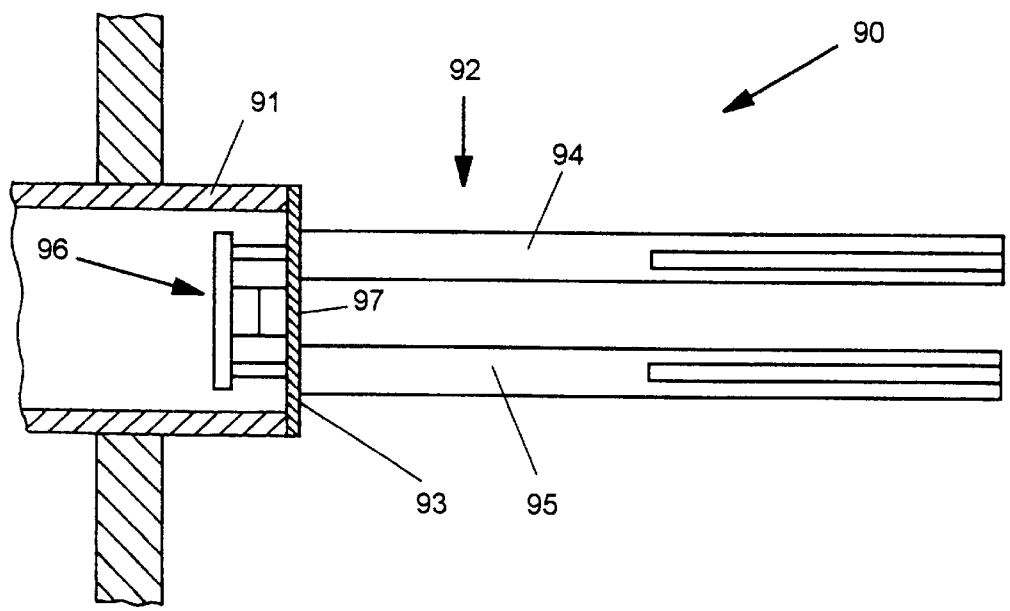
FIG. 9 is an illustration of a third embodiment of the assembly in accordance with the invention.

Referring now to FIG. 9 there is illustrated yet another embodiment of a level sensor 90 including a low-frequency sensing system and a high-frequency sensing system. In the same way as the level sensors 10 and 60 described hitherto the level sensor 90 has a tubular housing 91 which carries a mechanical vibrator system 92 consisting of a diaphragm 93 and two vibrating rods 94, 95 and is induced by a transducer system 96 into vibration at its natural resonance frequency. The mechanical vibrator system 92 forms in contact with an exciting/evaluation circuit of the type as shown in FIG. 2 the low-frequency sensing system. Unlike the embodiments as described hitherto the level sensor 90 has, however, no elastic waveguide for transmitting the ultrasonic waves; instead the high-frequency sensing system is configured by the portion 97 of the diaphragm 92 located between the vibrating rods 94 and 95 being induced to vibrate at a frequency which is substantially higher than the natural resonance frequency of the low-frequency mechanical vibrator system 92 and preferably corresponding to the natural resonance frequency of the diaphragm portion 97. This excitation is induced preferably by the same transducer system 96 as used also for exciting the natural resonance vibration of the low-frequency mechanical vibrator system 92. This may be achieved, for example, by the transducer system 96 being switched to be alternatingly inserted in a self-exciting circuit for the low-frequency vibration of the mechanical vibrator system 92 and in a self-exciting circuit for the high-frequency vibration of the diaphragm portion 97. In this case, monitoring the level by the high-frequency sensing system is done not by measuring the travel time but by evaluating the natural resonance frequency of the diaphragm portion 97 which is lower when the diaphragm portion is covered by the material than when the diaphragm portion is vibrating in air.

It will be obvious to the person skilled in the art that various modifications may be made to the embodiments as described. Thus, instead of using a mechanical vibrator system having two vibrating rods vibrating opposingly for the low-frequency sensing system, other known mechanical vibrator systems may be employed, for example vibrator systems having only one vibrating rod. In the same way, the transducer system for the low-frequency sensing system may be configured in any way known as such, for example, the two electromechanical transducers may be arranged juxtaposed at the diaphragm or they may be applied on the bimorph drive principle known from DE 195 23 461 A1 in which they are applied to an additional diaphragm arranged parallel to the diaphragm carrying the vibrating rods and to which it is mechanically coupled.

We claim:

1. An assembly for sensing and/or monitoring the level of a material in a vessel with the aid of a level sensor comprising a mechanical vibrator system and an electromechanical transducer system, the level sensor being applied to the vessel so that the mechanical vibrator system comes into contact with the material when the material has attained a predetermined level, and wherein said transducer system is connected to a low-frequency emitter circuit configured so that it induces a low-frequency vibration in said mechanical vibrator system, said assembly further comprising a low-frequency detector circuit furnishing from evaluating said frequency and/or amplitude of an electrical signal furnished by said transducer system an output signal indicating whether said mechanical vibrator system has come into contact with said material or not, wherein a component of said level sensor coming into contact with said material, once having attained a predetermined level, is connected to an electromechanical transducer system for inducing high-frequency elastic vibration in said component and wherein a high-frequency evaluation circuit being provided which by detecting an electrical signal generated as a function of said high-frequency elastic vibration produces an output signal indicating whether said component is in contact with said material or not.

2. The assembly as set forth in claim 1, in which said component is configured as an elastic waveguide in which said high-frequency elastic vibration propagates as an elastic wave and said detector circuit sensing and detecting the travel time of said elastic wave.

3. The assembly as set forth in claim 2, in which said electromechanical transducer system for exciting said high-frequency elastic vibration is connected to an emitter circuit for producing short vibration pulses and that said evaluation circuit detects said travel time between emission of a vibration pulse and reception of a reflected echo pulse through said transducer system.

4. The assembly as set forth in claim 2, in which said transducer system is formed by a piezoelectric transducer.

5. The assembly as set forth in claim 2, in which said component of said level sensor configured as said elastic waveguide is a vibrating rod protruding into said vessel.

6. The assembly as set forth in claim 5, in which said vibrating rod is configured as a hollow tube.

7. The assembly as set forth in claim 2, in which said component of said level sensor configured as said elastic waveguide is a tubular part serving to mount said mechanical vibrator system, said tubular part protruding into said vessel.

8. The assembly as set forth in claim 2, in which said elastic waveguide is arranged vertically in said housing and that said high-frequency evaluation circuit establishes the length of the section of said waveguide immersed in said material by measuring said travel time.

9. The assembly as set forth in claim 1, in which said high-frequency evaluation circuit evaluates frequency of said high-frequency elastic vibration of said component of said level sensor.

10. The assembly as set forth in claim 9, in which said mechanical vibrator system comprises a diaphragm and two vibrating rods each secured by one end to said diaphragm and that said component of said level sensor inducing high-frequency elastic vibration is said section of said diaphragm located between said fastener points of said vibrating rods.

11. The assembly as set forth in claim 10, in which a common electromechanical transducer system acting on said diaphragm is operated alternatingly for inducing said low-frequency natural resonance vibration of said mechanical vibrator system and for inducing said high-frequency elastic vibration of said diaphragm section.

12. The assembly as set forth in claim 3, in which said transducer system is formed by a piezoelectric transducer.

13. The assembly as set forth in claim 3, in which said component of said level sensor configured as said elastic waveguide is a vibrating rod protruding into said vessel.

14. The assembly as set forth in claim 4, in which said component of said level sensor configured as said elastic waveguide is a vibrating rod protruding into said vessel.

15. The assembly as set forth in claim 3, in which said component of said level sensor configured as said elastic waveguide is a tubular part serving to mount said mechanical vibrator system, said tubular part protruding into said vessel.

16. The assembly as set forth in claim 4, in which said component of said level sensor configured as said elastic waveguide is a tubular part serving to mount said mechanical vibrator system, said tubular part protruding into said vessel.

17. The assembly as set forth in claim 3, in which said elastic waveguide is arranged vertically in said housing and that said high-frequency evaluation circuit establishes the length of the section of said waveguide immersed in said material by measuring said travel time.

18. The assembly as set forth in claim 4, in which said elastic waveguide is arranged vertically in said housing and that said high-frequency evaluation circuit establishes the length of the section of said waveguide immersed in said material by measuring said travel time.

19. The assembly as set forth in claim 5, in which said elastic waveguide is arranged vertically in said housing and that said high-frequency evaluation circuit establishes the length of the section of said waveguide immersed in said material by measuring said travel time.

20. The assembly as set forth in claim 6, in which said elastic waveguide is arranged vertically in said housing and that said high-frequency evaluation circuit establishes the length of the section of said waveguide immersed in said material by measuring said travel time.

21. The assembly as set forth in claim 7, in which said elastic waveguide is arranged vertically in said housing and that said high-frequency evaluation circuit establishes the length of the section of said waveguide immersed in said material by measuring said travel time.

* * * * *